United States Patent [19]
Payne

[11] 3,947,692
[45] Mar. 30, 1976

[54] DIGITAL TRANSDUCERS
[75] Inventor: Viron E. Payne, Merritt Island, Fla.
[73] Assignee: Viron E. Payne, Inc., Merritt Island, Fla.
[22] Filed: Aug. 5, 1974
[21] Appl. No.: 494,751

[52] U.S. Cl. ................. 250/577; 73/301; 73/304 R; 250/209; 250/214 DC; 340/244 R
[51] Int. Cl.² ........................................ G01F 23/22
[58] Field of Search .......... 250/577, 357, 306, 208, 250/209, 578; 340/244 R, 244 C; 73/290 R, 292, 301, 304 R, 304 C

[56] References Cited
UNITED STATES PATENTS
3,186,224  6/1965  Mair.................................. 73/304 R
FOREIGN PATENTS OR APPLICATIONS
1,110,175  4/1968  United Kingdom............. 340/244 C
OTHER PUBLICATIONS
Article in "IZV Inst. Elektron," (Bulgaria), Vol. 5, 1971, pp. 167–172, by M. Marinov, *A Contact Levelmeter with Transistor Converter in Decimal Code.*

*Primary Examiner*—Archie R. Borchelt
*Assistant Examiner*—E. R. LaRoche
*Attorney, Agent, or Firm*—Duckworth, Hobby & Allen

[57] ABSTRACT

A digital transducer comprises a container having two disparate materials therein defining an interface, the interface being movable through the container responsive to a force, or forces, applied to one, or both, of the materials. A plurality of sensors are spaced along the container for sensing the interface, each of which is responsive to the presence of one of the materials. Means are included for suppressing the outputs of all of the sensing means responsive to the one material except that one sensing means which is responsive to the one material and nearest the interface.

14 Claims, 6 Drawing Figures

DIGITAL TRANSDUCERS

BACKGROUND OF THE INVENTION
1. Field of the Invention

The present invention relates to transducers, and in particular, relates to improvements in transducers of the type adapted for detecting the interface between two disparate materials and providing a digital signal output representative thereof.

2. Description of the Prior Art

There are a variety of prior art transducers useful for measuring the interface between two disparate materials and providing an electrical signal output representative thereof.

In U.S. Pat. Ser. No. 999,012, Dansinger discloses an aircraft equilibrium device employing a curved tube having a flow mass of metallic pellets therein and sensing electrodes spaced along the tube in order to detect the relative movement of the metal pellets during changes of position while the aircraft is in flight.

Wilkinson, in U.S. Pat. No. 1,106,907, discloses a flow meter employing a conductive fluid, e.g., mercury, in a pressurized tube as a means for allowing current to flow between the sensing electrodes and a point of common potential. The signal output from the sensors then energizes lights to provide means for visually indicating the pressure in the tube.

In U.S. Pat. No. 1,638,814, Epstein shows an arrangement mounted along the flow tube for detecting the rise and fall of a conductive fluid therein.

Hendrickson, in reissue U.S. Pat. Re. No. 19,234, teaches a tilt gauge employing a straight tube having plural electrical contacts associated at opposite ends of the tube. Another tilt gauge arrangement is disclosed by Cole in U.S. Pat. No. 1,974,411.

An arrangement is taught in U.S. Pat. No. 1,978,392 to Brockdorff in which conductive sensors are randomly disposed at varying heights inside a chamber.

A low capacity switch operative when the associated tube or liquid filled container is tilted in an appropriate manner is taught in U.S. Pat. No. 1,982,717 to Wilhelm. A somewhat similar arrangement is disclosed in U.S. Pat. No. 2,935,579 to Fishman. Other tilt gauges and liquid switches are disclosed by Klinger in U.S. Pat. No. 3,372,386 and Eubank in U.S. Pat. No. 3,582,590.

In the arrangements described above, the electrical signal outputs from the sensing means are not readily adaptable to digital data processing techniques.

SUMMARY OF THE INVENTION

The present invention contemplates a digital transducer comprising a container having two disparate materials therein defining an interface therebetween, the interface being movable through the container responsive to a force, or forces, applied to one, or both, of the materials. A plurality of means are spaced along the container for sensing the interface, each of the sensing means responsive to the presence of one of the materials. Means are provided for suppressing outputs from all of the sensing means responsive to the one material and nearest the interface.

For purposes of this invention and the description thereof set forth below, the term "materials" is broadly construed to include a vacuum. Thus, in accordance with this invention, the interface between two disparate materials may comprise an interface between a vacuum or partial vacuum and a fluid, for example.

An important aspect of the present invention is the manner in which the sensor output suppressing means allows each sensor output to be readily employed in a digital format for further data processing.

In one embodiment according to the present invention, a transducer is described employing a sphere with a conductive fluid therein. Other improvements are described in the following specification and defined in the appended claims.

THE DRAWINGS

DETAILED DESCRIPTION

Several embodiments of digital transducers in accordance with the present invention are described below.

Example One

Figure 1:
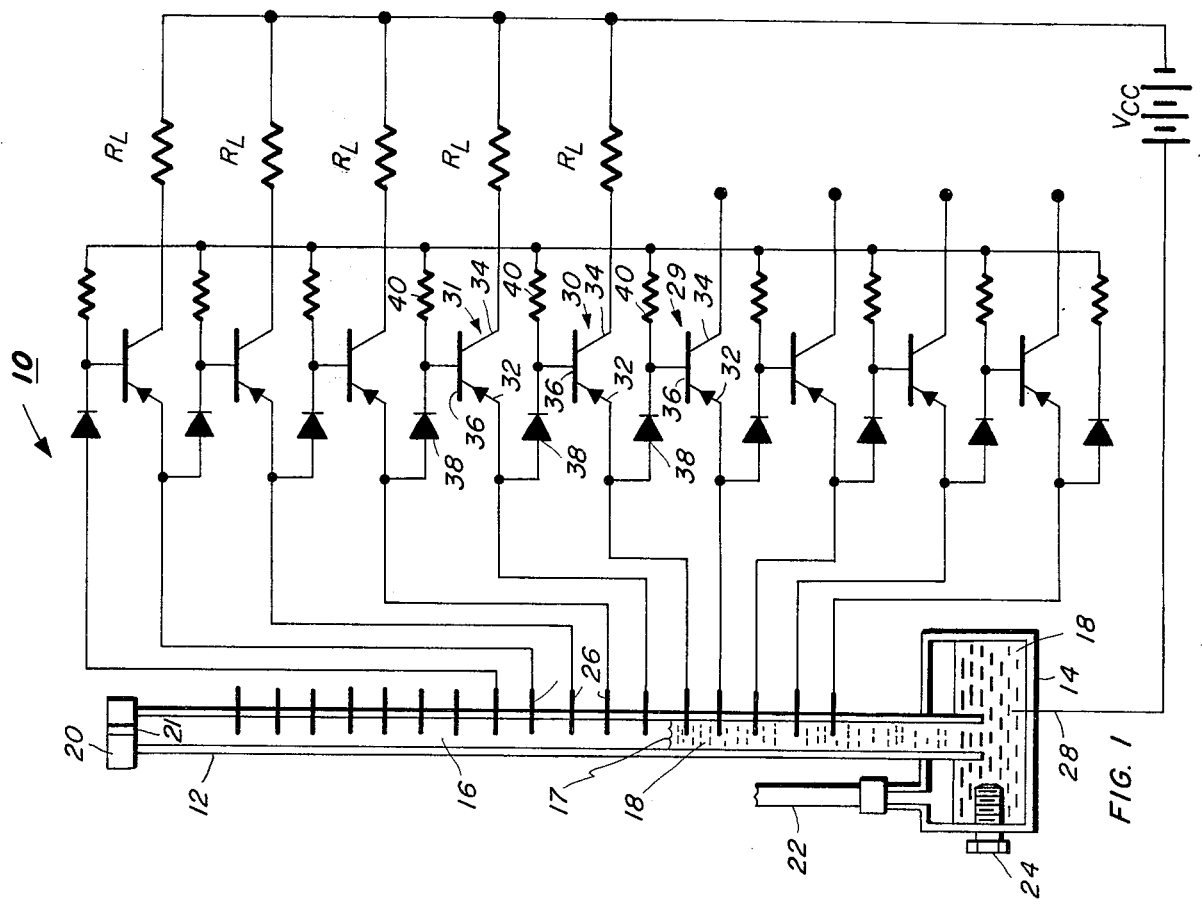
FIG. 1 illustrates one embodiment of the present invention shown in partially cross section and partially in schematic circuit diagram form.

The digital transducer of FIG. 1 is referred to generally as 10. The transducer 10 comprises a tube 12 of an insulating material, such as glass, communicating with the reservoir 14 having an electrically conductive fluid 18 (as mercury) disposed therein. Air 16 or a similar inert, nonconductive gas or liquid is separated from the conductive fluid 18, thereby defining an interface 17 therebetween. A cap 20 having an opening 21 therethrough is fitted over the tube 12 at the upper extremity thereof.

Noting the reservoir 14, there is provided an input pipe 22 through which air or other fluid is employed to move the conductive fluid 18 responsive to an external force (or vacuum). An adjusting screw 24 provides means for setting the zero pressure level of the conductive fluid 18.

The digital transducer 10 is provided with a plurality of electrodes 26 spaced along tube 12, each electrode 26 extending through the tube 12 and adapted to sense the presence of the conductive fluid 18 by conductive current from each respective electrode and through the conductive fluid to an electrode 28 of common potential (as ground).

In accordance with the present invention, the digital transducer 10 is provided with means for suppressing outputs from all of the electrodes 26 except that one electrode which is responsive to the presence of the conductive fluid 18 and nearest the interface 17. In the embodiment of FIG. 1, this means comprises a plurality of transistors, including transistors 29, 30 and 31, each of which includes emitter and collector terminals 32 and 34 respectively, and a base terminal 36 adapted to control current flow between the emitter and collector. As shown in the schematic circuit portion of FIG. 1, each electrode 26 is coupled to one of the emitters 32 and into the base terminal 36 of the next adjacent transistor which senses the next lower level of conductive fluid 18. A diode 38 is coupled into this emitter-base connection and is poled to allow current flow into the base terminal 36. All of the base terminals 36 are coupled through respective resistors 40 to a biasing voltage $V_{cc}$. The collector terminals 34 of the transistors 29–31 provide an output into respective load resistors $R_L$ in a manner hereinafter described with respect to the operation of the digital transducer 10.

In operation, the transistors 29–31 of the digital transducer 10 are biased to a conduction condition. An appropriate voltage which may be a biasing voltage $V_{cc}$, for example, is placed between all of the collector terminals 34 and the common electrode 28. Thereafter, a pressure which is to be measured is exerted on the electrically conductive fluid 18 via the pipe 22. Alternatively, a vacuum may be applied through the opening 21 of cap 20. As the conductive fluid 18 rises in the tube 12, each successive electrode 26 "senses" the interface 17 by completing a current path defined by the common electrode 28, through the conductive fluid 18, through each electrode 26 in contact with the fluid 18 and through the respective transistor 29, 30 or 31 between the emitter and collector terminals 32, 30.

Note that in the specific arrangement of FIG. 1, in which the interface 17 is just adjacent to the electrode 26 associated with transistor 30 (but below electrode 26 with transistor 31), as current flows into the emitter terminal 32 of transistor 30, current flows through the diode 38 into the base terminal 36 of transistor 29. This turns transistor 29 off. In the same manner, the diode below transistor 29 had turned off the previously conducting transistor. Accordingly, the only conducting transistor is that transistor 30 which is associated with the electrode 26 nearest the interface 17. In this way, a single output in a digital format is provided corresponding to level of the conductive fluid 18 in the tube 12, which in turn, corresponds to the amount of applied force or vacuum. While a relatively small number of spaced electrodes 26 are shown in FIG. 1, it will be understood by those skilled in the art that the packing density of the electrodes 26 may be increased to effect greater resolution of the measurement of the fluid level in the tube 12.

Example Two

Figure 2:
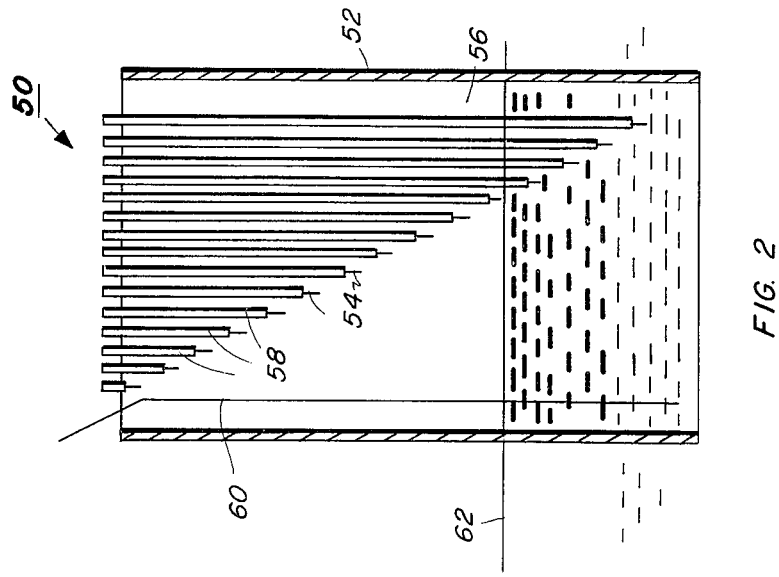
FIG. 2 is a front view of a second embodiment of a digital transducer according to the present invention.

A second example of a digital transducer in accordance with the present invention is shown in FIG. 2 and described with reference thereto.

Noting FIG. 2, this second embodiment, referred to generally as 50, comprises a rigid member 52, for example an open ended tube, having a plurality of conductive wires 54 fixed to a wall 56 of the member. Each wire 54 includes an insulating sleeve 58, with one end of the wire exposed. The wires 54 are disposed such that the exposed ends thereof are distributed in spaced relationship in a vertical direction one with respect to the other when the member 52 is inserted in a conductive fluid body 62, described below. The digital transducer 50 of FIG. 2 further comprises a bare common return lead 60 fixed along the wall 56. In use, the member 52 is placed in a body of a relatively conductive fluid 62, such as a lake or ocean. The transducer 50 is useful for determining the level of the body 62.

Example Three

Figure 3:
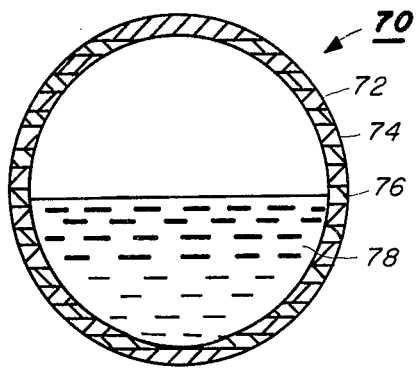
FIG. 3 is a cross sectional, side view illustrating a third embodiment of a digital transducer in accordance with the present invention.

A third embodiment is referred to generally as 70 in FIG. 3.

The transducer 70 comprises a hollow sphere 72 formed by concentric rings of alternatively conductive and non-conductive materials. (The conductive materials are references as 74 and the non-conductive materials as 76.) A conductive fluid 78 is disposed within the sphere 72. Although the connections to an external circuit are omitted in FIG. 3 for purposes of clarity, it will be understood that the conductive rings 74 may be connected to a suppression circuit similar to that of FIG. 1, in order to sense the interface 79 in the sphere 72 between the conductive fluid 78 and air, or similar inert material, as described in detail above. The transducer 70 of FIG. 3 is useful as both a tilt gauge or as an accelerometer, in a well known manner.

Example Four

Figure 4:
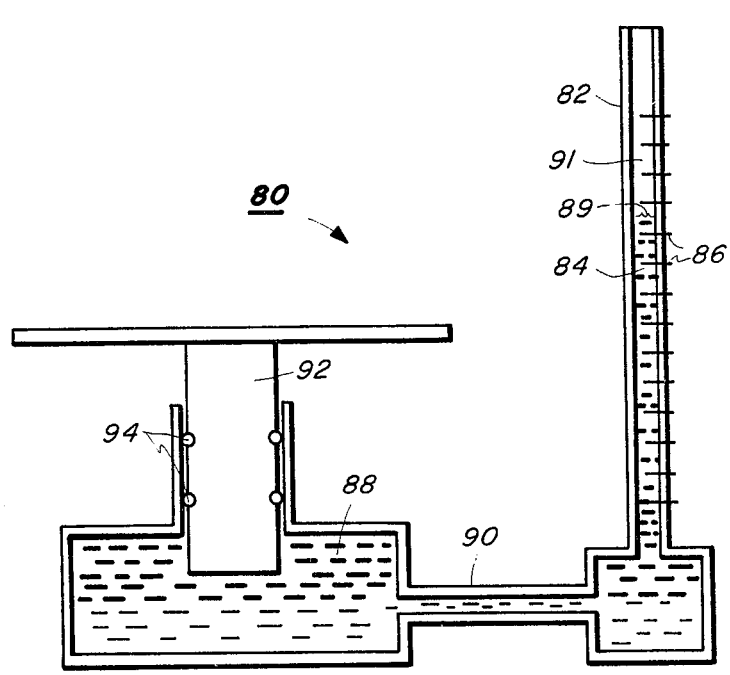
FIG. 4 depicts a front view, in cross section, of a fourth embodiment.

A fourth example is referred to generally as 80 in FIG. 4.

The digital transducer 80 comprises an upstanding, hollow tube 82 having a conductive fluid 84 disposed therein, with a plurality of electrodes 86 along the tube, in the same manner as the electrodes 26 in FIG. 1. A reservoir 88 is provided, with a conduit 90 communicating between the reservoir and tube 82. A piston 92 is movably positioned in the reservoir by O-ring seals 94. In use, the transducer 80 functions as a digital weight scale. When a weight is placed on the piston 92, the fluid 84 moves upward in the tube 82, thereby providing an indicia of the weight which can be measured as the changing position of the interface 89 between the conductive fluid 84 and the inert material 91. Again it will be understood that the output suppression circuit of FIG. 1 may be employed with the transducer 80 of FIG. 4.

Example Five

Figure 5:
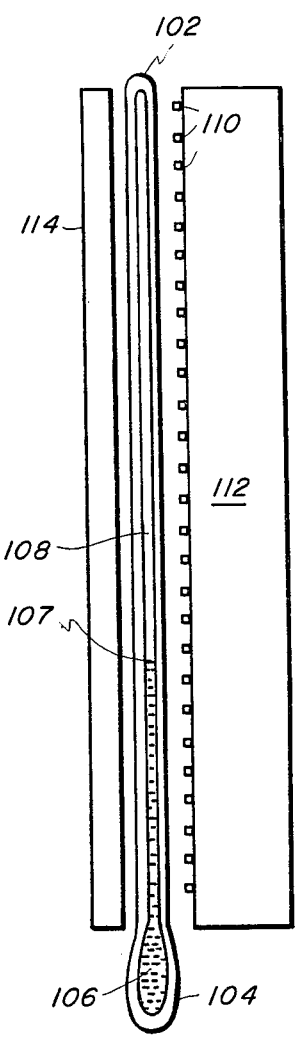
FIGS. 5 and 6 are front cross sections and top cross section views, respectively of a fifth embodiment.
Figure 6:
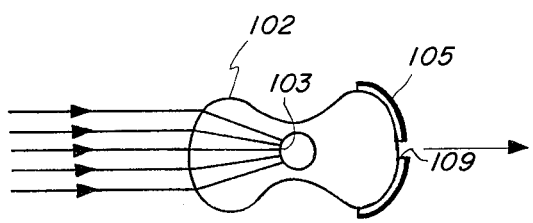

A digital thermometer according the present invention is shown in FIGS. 5 and 6.

The digital thermometer, referred to generally as 100, includes an upstanding, hollow tube 102 having a reservoir 104 on the bottom thereof. In this example, the fluid 106 within the tube 102 comprises a fluid which is opaque to light. Mercury is suitable in this regard. However, it is necessary that the other material, normally a vacuum, 108 forming the interface 107 with the other fluid 106 be transparent to the passage of light.

The digital thermometer is provided with a photoemitter-sensor arrangement whereby light is directed through the tube 102 to detect the level of the interface 107 between the two fluids 106, 108. In this embodiment, this photoemitter-photodetector arrangement includes a single photoemitting lamp 114 disposed alongside the tube 102. The photodetector, in this example, comprises an array of discrete photodetectors 110 disposed alongside the tube 102 opposite the photoemitter 114, with suitable electronics 112, which may be similar to the output suppression circuit of FIG. 1. Alternatively, an integrated photodetector array of this type manufactured by the Reticon Corporation of Mountain View, California, may be employed in place of a discrete array. In operation, the opaque fluid blocks the passage of light between the photoemitter 114 and the photodetectors 110 a the interface 107 rises in the tube 102. The level of the interface 107 is thus detected in a manner similar to that described with respect to the digital transducer 10 of FIG. 1.

A specific cross-sectional arrangement useful for the tube 102 is shown in FIG. 6. In this arrangement, the tube 102 is comprised of a transparent material, such as glass, formed in a double inverted, convex arrangement, with the bore 103 disposed at the intersection of the two inverted, convex portions. One side of the tube 102 is provided with an opaque coating 105, having an aperture 109 allowing light to exit therethrough.

Other modifications to the above described examples will be clear from the various combinations and arrangements of the various examples described above. Further, it will be appreciated by those skilled in the art that a wide variety of sensing means may be employed in lieu of the electrical and photoconductive means described.

I claim:
1. A digital transducer comprising:
   a container;
   two disparate materials in said container defining an interface therebetween, said interface being movable through said container responsive to a force applied to one of said materials;
   a plurality of means spaced along said container for sensing said interface, each of said sensing means responding to the presence of one of said materials;
   means coupled to all of said sensing means for electrically suppressing outputs from all of said sensing means responding to said one material except that one sensing means which responds to said one material and is nearest said interface, said output suppressing means comprising a plurality of active circuit elements, each having first and second terminals and another terminal for controlling current flow between said first and second terminals, one of said first and second terminals of each circuit element being coupled to the output of one of said sensing means, said control terminal of each circuit element being coupled to the next adjacent circuit element at said one terminal of said first and second terminals which is coupled to the output of the corresponding sensing means; and means interposed between said control terminal and said one terminal of said next adjacent circuit element for allowing current flow therebetween only in one direction.

2. The apparatus recited in claim 1 further comprising:
   said container being defined by a tube, said tube comprising a transparent material having a relatively thick wall defining a double inverted, convex arrangement relative to light perpendicular to said tube;
   one of said materials comprising an opaque fluid which expands and contracts responsive to changes in temperature;
   said sensing means comprising a plurality of photoemitting devices along one side of said tube and corresponding photodetecting means on the opposite side of said tube; and
   a reservoir for said fluid communicating with said tube.

3. The apparatus recited in claim 1 wherein said material to which said sensing means are responsive comprises a conductive fluid.

4. The apparatus recited in claim 3 wherein said conductive fluid comprises a fluid opaque to light.

5. The apparatus recited in claim 3 wherein said conductive fluid comprises an electrically conductive liquid.

6. The apparatus recited in claim 3 wherein said sensing means are disposed along said container, and wherein said fluid moves directly responsive to said force.

7. The apparatus recited in claim 6 wherein said conductive fluid is opaque to light and said sensing means comprises a plurality of photo-sensing devices spaced alongside said container and adapted to detect the presence of said fluid.

8. The apparatus recited in claim 6 further comprising:
   a reservoir for said conductive fluid;
   a conduit for said fluid communicating between said tube and said reservoir;
   a piston movably positioned in said reservoir; and wherein
   said piston moves into said reservoir responsive to said force.

9. The apparatus recited in claim 6 wherein said sensing means comprises a plurality of electrically conductive electrodes disposed along the path of movement of said conductive fluid.

10. The apparatus recited in claim 9 further comprising:
    a member adapted to be inserted into a body of said conductive fluid, said body defining said container;
    said sensing means constituting a plurality of conductive electrodes fixed to said member, each said electrode being disposed so that one end thereof is distributed in spaced relationship in a vertical direction one with respect to the other when said member is inserted into said conductive fluid body; and wherein
    said output-suppressing means is coupled to the other end of said electrodes.

11. The apparatus recited in claim 6 wherein said container comprises a sphere.

12. The apparatus recited in claim 11 wherein said sphere comprises concentric conductive rings.

13. The apparatus recited in claim 12 further comprising concentric rings of non-conductive material.

14. The apparatus recited in claim 13 wherein each said non-conductive ring is interposed between conductive rings, with said fluid disposed within said sphere.

* * * * *